R. D. VALENTINE.
FARM TRACTION ENGINE.
APPLICATION FILED FEB. 27, 1914.

1,198,879.

Patented Sept. 19, 1916.
3 SHEETS—SHEET 2.

Witnesses:
Theo. Lagaard.
H. A. Bowman.

Inventor:
Robert D. Valentine
By F. A. Whiteley
his Attorney.

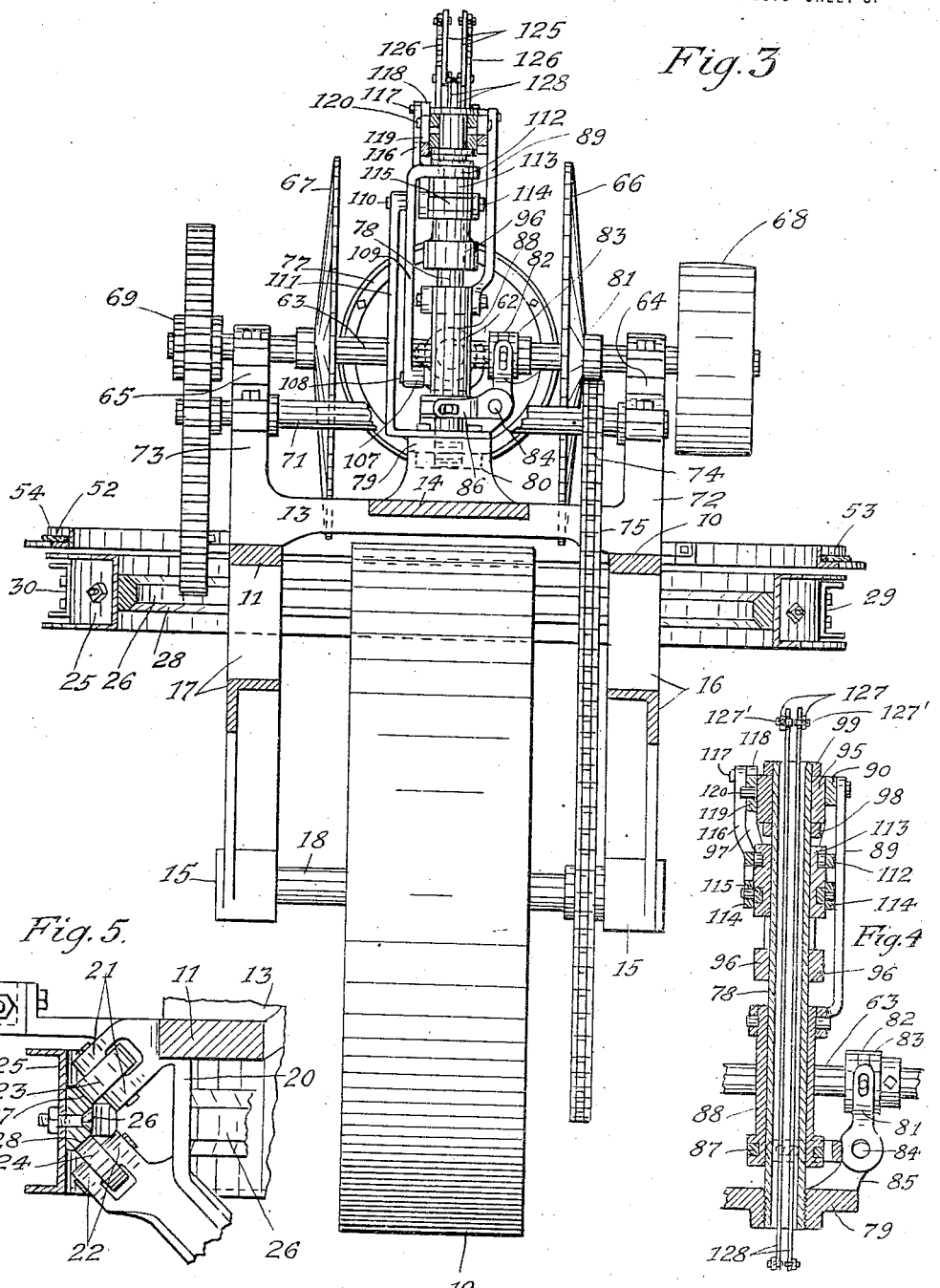

UNITED STATES PATENT OFFICE.

ROBERT D. VALENTINE, OF MINNEAPOLIS, MINNESOTA, ASSIGNOR, BY MESNE ASSIGNMENTS, TO CORN BELT TRACTOR COMPANY, OF MINNEAPOLIS, MINNESOTA, A CORPORATION OF SOUTH DAKOTA.

FARM TRACTION-ENGINE.

1,198,879.  Specification of Letters Patent.  Patented Sept. 19, 1916.

Application filed February 27, 1914. Serial No. 821,464.

*To all whom it may concern:*

Be it known that I, ROBERT D. VALENTINE, a citizen of the United States, residing at Minneapolis, in the county of Hennepin and State of Minnesota, have invented certain new and useful Improvements in Farm Traction-Engines, of which the following is a specification.

My invention relates to farm traction engines, particularly of the type which may be employed for cultivating, harrowing, plowing and similar farm operations.

It is the object of my invention to provide a traction engine comprising a power unit having a single traction wheel, which wheel runs in advance of the implement or vehicle pulled by the engine and itself is oscillated to steer the said engine and vehicle.

My invention embraces broadly an organization for effecting these results, and more specifically a unitary frame system having a supporting portion in which the traction wheel is journaled, said frame system providing means for mounting the motor and transmission, together with means for coupling said frame system to any implement, such as a set of plows or a cultivator, so that said frame system may be oscillated relative to said implement, means being provided on the implement and fixed in relation thereto and having the necessary connection with the desired parts on the frame system for controlling the motor and the frame system from the operator's seat on the vehicle.

The full objects and advantages of my invention will appear in connection with the detailed description thereof and are particularly pointed out in the claims.

Figure 1:
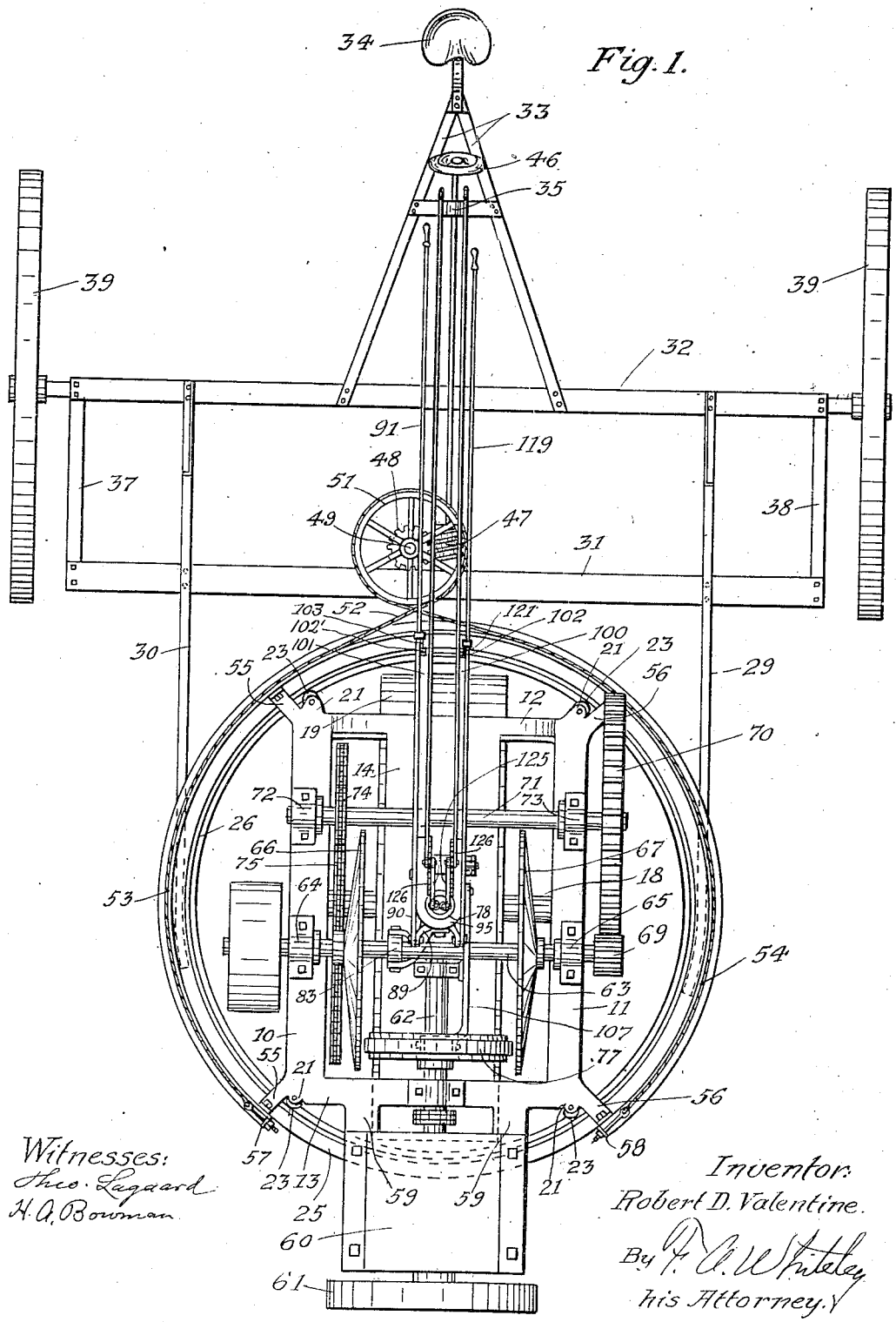
Figure 2:
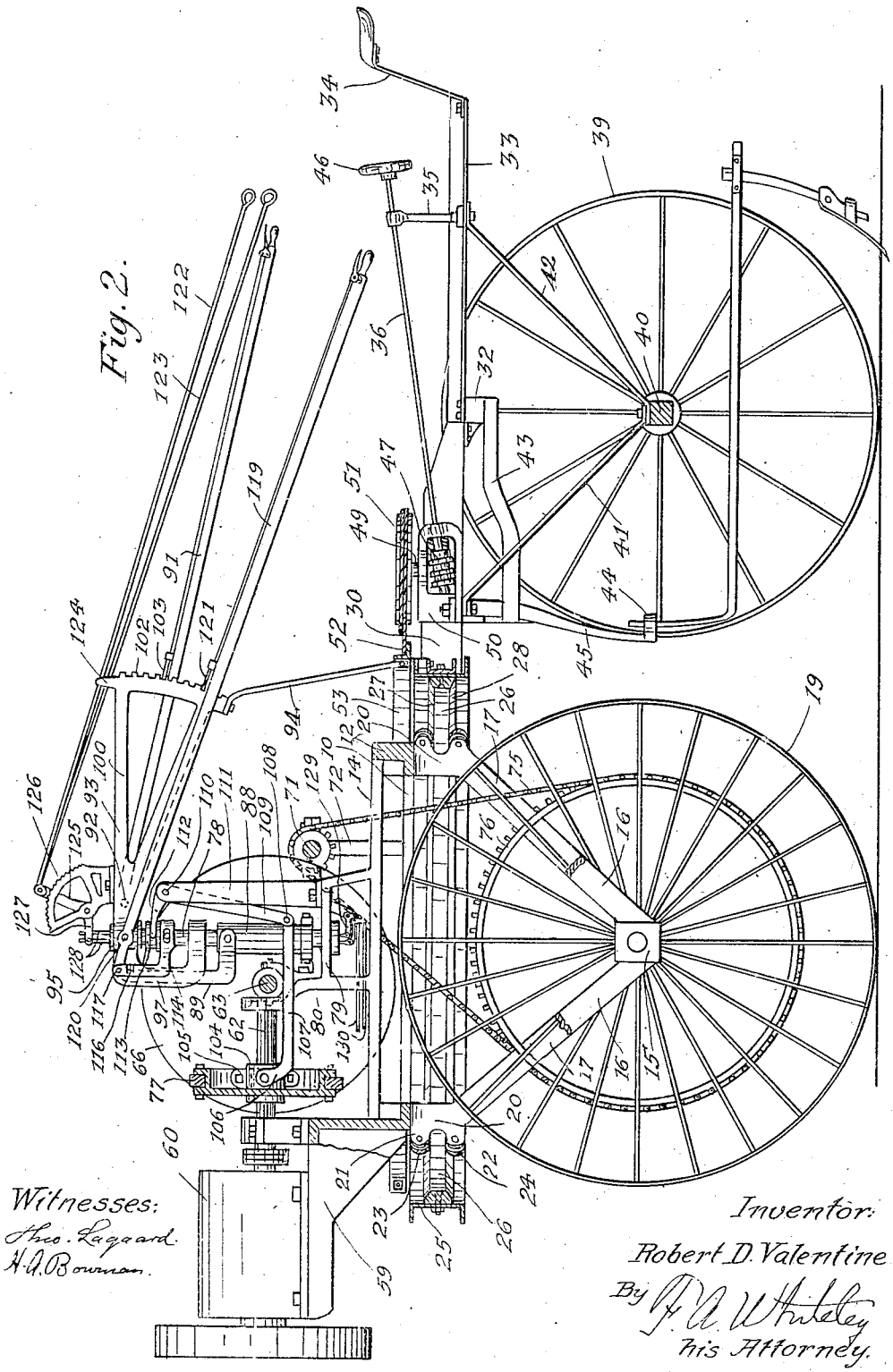

In the drawings, illustrating the application of my invention in one form, Figure 1 is a plan view of the traction engine unit shown as coupled to a farm vehicle, such as a cultivator. Fig. 2 is a side elevation of the same. Fig. 3 is an end elevation partly in section. Fig. 4 is a sectional elevation of the central control standard showing connected parts. Fig. 5 is a detail of the frame mounting.

The main frame of the engine unit, which may be in the form of a single casting or may be fabricated from wrought iron or other metal in any manner desired, comprises a rectangular structure having side beams 10 and 11 and connecting end beams 12 and 13. A central beam or platform 14 in the top plane of the end beams 12 and 13 is also provided. Extending from the corners of the said rectangular frame and forming a junction, as indicated at 15, are pairs of supports 16 and 17, respectively, these supports being preferably formed in angle shape. The junction point 15 provides journals for the shaft or live axle 18 upon which is secured a traction wheel 19, the wheel 19 being of such size relative to the supports 16, 17 as to come just below the platform 14 when said wheel is assembled in the frame. The supports 16 and 17 are provided with short vertical portions 20 adjacent the point where said supports are united with the side beams 10 and 11, as best shown in Figs. 2 and 5. The sections 20 are provided with pairs of obliquely disposed ears 21 and 22, in which are journaled antifriction rollers 23 and 24. The rollers 23, 24 provide the means of coupling the engine frame unit to the frame connection for the implement or vehicle so as to permit relative oscillation of the engine frame unit, as will now be described.

A circle 25, preferably formed of channel iron with the flanges turned outwardly, has bolted to the inside thereof a circular ring 26 provided with beveled annular faces 27, 28, with which the rollers 23 and 24 will contact when the ring 25 is assembled upon the rectangular frame. It will thus appear that the ring 25 will be supported by the rectangular frame and the traction wheel 19 so as to be capable of free rotative movement relative to said frame and traction wheel. Secured to the side web of the ring 25, and extending tangentially thereto in parallel relation, are a pair of channel iron beams 29 and 30, which beams are connected by a pair of crossbars 31 and 32. To the member 32 is bolted a supplemental frame 33, which forms a support for an operator's seat 34 and for a standard 35 in which is journaled the steering shaft 36.

The frame pieces 31 and 32 are preferably additionally secured together by end frame pieces 37, 38. To this rearwardly extending frame portion, having capacity for relative rotation in a horizontal plane with respect to the engine frame and traction wheel, I design to have secured in any desired manner, the implement or vehicle which my traction engine will operate. This implement may be especially constructed to be attached to my engine, as in the form shown, and a set of such implements and vehicles may be provided to be interchangeably associated with my traction engine; but it is within the scope of my invention that implements or vehicles as ordinarily constructed may be secured to frame members 31, 32 so as to be drawn by the traction engine. In any event, the wheels 39 of said implement or vehicle will provide a support for said rearwardly extending frame. In the form shown, the wheels 39 are journaled upon an axle 40, which is connected with the frame member 31 by means of braces 41 and with the supplemental frame 33 by means of braces 42, the cultivator teeth in the form shown being indicated as carried by a crossbar 44 pivoted to arms 45 depending from frame members 29 and 30, said arms being additionally braced by bars 43 connected with cross beam 32.

It will be apparent that in the above organization of elements the steering of the machine, considered as an entirety, is effected by oscillating the traction wheel 19 and the rectangular frame and parts thereon supported by said traction wheel. For this purpose the steering shaft 36, having thereon hand wheel 46, is provided with a worm 47 meshing with a worm wheel 48 on a short vertical shaft 49 journaled in a bracket 50 secured upon crossbar 31. The shaft 49 has thereon a drum 51, around which extends a cable 52. The ends of cable 52 extend in reverse directions about circular flange pieces 53 and 54 bolted to pairs of arms 55 and 56 extending from side beams 10 and 11, respectively, said ends being secured, as indicated at 57, 58, to the ends of said flange pieces 53, 54. It will be apparent, therefore, that by rotation of hand wheel 46 and steering shaft 36, the drum will be rotated in the desired direction and through the operation of the cable 52 will oscillate the engine frame and traction wheel 19 upon the point of support of said traction wheel on the ground as a pivot. The large leverage obtained through the worm wheel 47, relatively small drum 51 and large drum formed by flange pieces 53 and 54, gives an exceedingly easy control, notwithstanding the weight of the part which must be oscillated.

The operative parts of the engine are mounted upon the rectangular engine frame above described. A shelf-like extension or bracket 59 forms a support for the motor, indicated diagrammatically at 60, which may be of any known type, preferably some form of explosive engine, and is provided with a fly wheel 61 and motor shaft 62 rearwardly extended in the vertical plane extending through the center of the traction wheel 19. A disk or pulley shaft 63 is journaled in standards 64, 65 upon frame members 10, 11 at the end of shaft 62 and extends in the plane of said shaft 62 at right angles thereto. Said shaft 63 has fast thereon a pair of friction disks 66, 67 equidistant from the center of shaft 62. At one end of shaft 63, outside of standard 64, is a belt pulley 68. Fast on the other end of shaft 63 is a pinion 69 meshing with a spur gear 70 fast on a shaft 71 journaled in bearings formed in standards 72, 73 on side beams 10 and 11. The drive shaft 71 has thereon a sprocket pinion 74 over which runs a sprocket chain 75, which in turn meshes with a large sprocket gear 76 fast on the traction wheel 19, by means of which said traction wheel is driven.

A friction wheel 77 is splined upon the shaft 62 between the friction disks 66 and 67. The friction wheel 77 is of less diameter than the distance between the disks 66, 67, so that when said disks are in the neutral position the friction wheel 77 will engage neither of them and shaft 63 will not be operated. The shaft 63 is mounted in its bearings on uprights 64 and 65 for longitudinal movement, pinion 69 being made wide for that purpose. Either of friction disks 66 or 67 may be caused to engage friction wheel 77, as desired, by sliding the shaft 63 and the friction disks connected therewith in either direction. When the friction wheel engages one disk the machine will be driven in a forward direction, and when the engagement is with the other disk the drive will be reversed. The speed may be varied at will by moving the friction wheel 77 longitudinally along shaft 62, such speed being slowest when said wheel is at its forward position and engages close to the outer periphery of the friction disks, and increasing as the friction wheel is caused to approach the centers of the friction disks. It will be clear that the draft power exerted will be proportional to the speed. It follows, therefore, that when my farm traction engine is employed at work involving relatively light draft, as cultivating or harrowing, it may be driven at relatively high speed, while if the draft is heavy, as would be the case in plowing, the speed may be decreased and the power at the drawbar relatively increased to meet the requirements of such work.

It will be obvious that control members for the transmission, reverse, fuel supply and magneto, as well as the steering device, must be extended within easy reach of the operator upon the seat 34 and must be fixed in position relative to said seat and the implement or vehicle drawn by the engine. All of the control elements, therefore, must transmit their movements through members which will permit the oscillation of the engine frame relative to said control members. To accomplish this I provide a tubular standard 78 threaded into a plate 79 so as to be rigidly carried thereby in a vertical position, the plate 79 being supported by a bracket extension 80 from table 14, as best shown in Fig. 3. The center of the tubular standard 78 is in the intersection of the vertical planes passing through the transverse and central diametrical axes of the traction wheel 19. It represents, therefore, the center of rotation about which the traction wheel and parts carried thereby are oscillated to steer the machine. As best shown in Figs. 3 and 4, the shaft 63 is moved endwise in either direction from or through its neutral position to engage either disk 66 or disk 67 with the friction wheel 77 by means of a fork 81 engaging a ring 82 journaled in a groove in a collar 83 fast on shaft 63. This fork is pivoted at 84 to a standard 85 carried by plate 79 and has a second fork arm 86 engaging a ring 87 in a groove on a sleeve 88 mounted for vertical sliding movement on standard 78. The sleeve 88 has pivotally connected therewith a link 89, which link in turn is pivotally connected with the end 90 of a lever 91 pivoted at 92 to the side of a segment stand 93, which is supported at its rear by an arm 94 and at its front portion by a double sleeve 95, 96 on the tubular standard 78, said sleeve being connected by a rib portion 97 and held in position on said tubular standard by collars 98, 99 at either side of the sleeve 95. The segment stand 93 has two portions 100, 101 provided with ratchet segments 102, 102'. The lever 91 extends into proximity with the seat 34 and has thereon a detent 103 for engaging in notches in segment 102' to hold the lever 91 in desired position. It will be obvious that but three such notches will ordinarily be used, one at the center corresponding to the neutral position of shaft 63 and friction disks 66, 67 carried thereby, in which neither of said disks engage friction wheel 77, and one at each side corresponding respectively to the positions in which friction disk 66 or friction disk 67 is brought into engagement with friction wheel 77.

The friction wheel 77, as best shown in Fig. 2, is provided with a sleeve 104, upon which is journaled a ring 105 engaged by a fork 106 on the end of a link 107. The link 107 is pivotally connected at 108 to the depending end of an arm 109 pivoted at 110 to a stand 111 supported by plate 79. The arm 109 has integrally connected therewith a fork 112, which engages within a ring in a sleeve 113 slidably mounted on tubular standard 78. A fork 114 engages a second ring 115 on sleeve 113, said fork 114 being rigid on an arm 116 pivotally connected at 117 to the end 118 of a lever 119 pivoted at 120 to the sleeve portion 95 of segment stand 93. From an inspection of Fig. 2, it will be apparent that when lever 119 is oscillated it will slide sleeve 113 on tubular member 78. This movement will be communicated to fork 112, the motion of which will be translated through arm 109 to link 107 and fork 106, by which the friction wheel 77 will be slid along shaft 62. The effective length of fork arm 112 is so proportioned to the length of arm 109 that a movement of lever 119 through the range permitted by segment 102 will slide the friction wheel 77 throughout the entire range of movement for changing speed from the minimum to the maximum rate, and vice versa. The segment 102 will be provided with a multiplicity of notches and the lever 119 with a detent 121 for engagement in said notches to permit holding the friction wheel 77 in any desired position of adjustment. The lever 119, like lever 91, is extended into proximity with seat 34.

It will be obvious that with the above described connections the transmission elements may be operated to effect the various driving conditions, ahead, reverse, and at different speeds, with perfect facility, however much the engine frame and supporting traction wheel 19 may be oscillated in steering the machine. The levers 91 and 119 will always have the same relative position in respect to the seat of the operator, except for such changes in position as occur in manipulating said levers for the purpose of controlling the transmission.

To control the fuel supply and magneto, I provide a pair of pull rods 122 and 123 sliding in guides 124 on the segment arms 100, 101 and connected to arms 125 pivoted to ratchet stands 126 carried by segment stand 93. Fast with arms 125 are arms 127, and said arms 127 have swiveled thereto by eye-bolts 127' flexible link rods 128, which, in turn, are pivotally connected to elbow levers 129, and these elbow levers, by means of rods 130, are connected with the fuel supply valve and magneto, respectively, not shown. Like the levers 91 and 119, the pull rods 122, 123 extend in proximity with the seat 34. The elbow levers 129 are, of course, fast on the engine frame, while the rods 128 are fast with the relatively movable stand 93 and implement frame. The rods 128 are, however, so close to the vertical axis of oscillation of the engine frame that, in view of their flexibility, the slight twist, one around the other, which takes place when the engine frame and traction wheel 19 are oscillated will have no appreciable effect upon these devices.

The simplicity and high degree of utility of my traction engine will be apparent. The entire weight of motor, transmission and, in fact, the whole machine, with the exception of the seat frame, is borne directly by the single traction wheel. The engine is responsive in a high degree to steering impulses, as it is the traction wheel itself which turns the device. It is practicable with my machine to turn the engine around in a space even less than that required to turn a horse-driven implement. The advantage of such quick turning in relatively small space will be apparent, especially when it is considered that it is the purpose of the engine to draw such farm implements as cultivators, where, from the circumstances of the case, but little room is available at the ends of the rows of corn and cotton or other growing plants which are operated upon by the machine. The engine can be made relatively very light for the concentration of the entire weight of the machine upon the single traction wheel will give a very large amount of tractive power with a comparatively light machine. Waste of power is reduced to a minimum, and all parts of the engine are accessible and easily got at for the purpose of lubrication or repair. Not only are side draft and the use of differential gearing entirely obviated in my machine, but, from the fact that the traction wheel itself is oscillated to change the direction of movement of the engine, it is practicable to make a turn as short as may be desired. The driven wheel being the element turned will always move in the direction in which it is turned however sharp an angle that may be, which is not possible of a steering mechanism pushed in advance of the driving elements, as is well-known.

I claim:

1. A traction engine comprising a single traction wheel, a frame supported by said traction wheel, a motor and transmission elements supported by said frame directly above the uppermost portion of the traction wheel, means for holding said frame and wheel in respective relative horizontal and vertical position, and means for oscillating the frame and wheel relative to said holding means.

2. A traction engine comprising a single traction wheel having an axle rigid therewith, a frame having arms at each side of the wheel, said axle being journaled therein, a motor and transmission elements mounted upon the frame above said axle and the highest portion of said wheel, a guide ring surrounding said frame and the upper part of said wheel, and means engageable with said guide ring for holding the frame and wheel in proper relative position and for permitting oscillation relative to the guide ring.

3. A traction engine comprising a traction wheel and a frame supported thereby, a circular guide surrounding said frame having a pair of angularly-disposed beveled faces, a plurality of pairs of angularly-disposed antifriction rollers engaging said beveled surfaces for holding the frame and traction wheel for oscillation about a vertical axis within said guide, and means under the control of the operator for effecting such oscillation to steer the traction engine.

4. A traction engine comprising a traction wheel, a substantially rectangular frame, supporting standards extending from the corners of said frame to the axle of the traction engine, a circular guide surrounding said frame having a pair of angularly-disposed annular surfaces, and pairs of angularly-disposed antifriction rollers upon each of said standards at the corners of the rectangular frame engaging said annular surfaces for holding the frame and traction wheel for oscillation about a vertical axis within said guide, and means under the control of the operator for effecting such oscillation to steer the traction engine.

5. A traction engine comprising a traction wheel, a substantially rectangular frame, supporting standards extending from the corners of said frame to the axle of the traction engine, a circular guide surrounding said frame having a pair of angularly-disposed annular surfaces, and pairs of angularly-disposed antifriction rollers upon each of said standards at the corners of the rectangular frame engaging said annular surfaces for holding the frame and traction wheel for oscillation about a vertical axis within said guide, circular flange members secured to the corners of said rectangular frame, a drum, a cable surrounding said drum and said flange members and secured at its ends to said flange members, and means under the control of the operator for rotating the drum.

6. A traction engine comprising a traction wheel and a frame supported thereby, said frame comprising a substantially rectangular horizontal portion extending across and above the traction wheel, a horizontal circular guide surrounding said frame, means on the frame engaging the guide for holding the frame and traction wheel for oscillation about a vertical axis within said guide, and means under the control of the operator for effecting such oscillation to steer the traction engine.

7. A traction engine comprising a traction wheel and a frame supported thereby, a circular guide surrounding said frame, means on the frame engaging the guide for holding the frame and traction wheel for oscillation about a vertical axis within said guide, a supplemental frame including a pair of members secured to said guide at diametrically opposite points and extending tangentially rearwardly, means extending into proximity with the seat of the operator on said last named frame for oscillating the traction wheel and its supported frame as a unit to steer the machine, and a wheeled implement or vehicle connected to and forming a support for the rear portion of said last named frame.

8. A traction engine comprising a traction wheel and a frame supported thereby, a motor and transmission elements supported by said frame and having operative connection with the traction wheel, a wheeled implement or vehicle, a device for connecting said wheeled member with said frame so that the frame and traction wheel may be moved about a vertical axis relatively to said wheeled member, means for controlling the transmission and motor having operating levers therefor extending into proximity with the seat of the operator on the said wheeled member, and connections between said control levers and controlling means permitting relative movement thereof about a vertical axis with the wheeled member and the frame respectively.

9. A traction engine comprising a traction wheel and a frame supported thereby, a motor and transmission elements supported by said frame and having operative connection with the traction wheel, a wheeled implement or vehicle, a device for connecting said wheeled member with said frame so that the frame and traction wheel may be moved about a vertical axis relatively to said wheeled member, a standard on said frame extending in said vertical axis, controlling means for the transmission and motor, control levers extending into proximity with the seat of the operator on the wheeled member, and means on said standard operatively connecting said levers with said controlling means so as to permit relative movement thereof with the wheeled member and the frame, respectively, about said vertical axis.

10. A traction engine comprising a traction wheel and a frame supported thereby, a motor and transmission elements supported by said frame and having operative connection with the traction wheel, a wheeled implement or vehicle, a device for connecting said wheeled member with said frame so that the frame and traction wheel may be moved about a vertical axis relatively to said wheeled member, members on the frame for controlling said transmission elements to reverse and change the speed of the engine, operating levers extending into proximity with the seat of the operator on the said wheeled member, a cylindrical standard having its center in said vertical axis, and sleeves movable along and about said standard forming an operative connection between said controlling members and said levers to permit relative movement thereof with the frame and the wheeled member, respectively, about said vertical axis.

11. A traction engine comprising a traction wheel and a frame supported thereby, a motor and transmission elements supported by said frame and having operative connection with the traction wheel, a wheeled implement or vehicle, a device for connecting said wheeled member with said frame so that the frame and traction wheel may be moved about a vertical axis relatively to said wheeled member, members on the frame for controlling said transmission elements to reverse and change the speed of the engine, members for controlling the motor, operating levers for all of said members extending into proximity with the seat of the operator on said wheeled member, a tubular standard having its center in said vertical axis, sleeves movable along and about said standard forming operative connections between part of said levers and said transmission controlling members, and axially rotatable flexible rods extending through said tubular standard providing operative connections between other levers and said motor control members, said connections permitting relative movement of the levers and the control members with the wheeled member and frame, respectively, about said vertical axis.

In testimony whereof I affix my signature in presence of two witnesses.

ROBERT D. VALENTINE.

Witnesses:
  H. A. BOWMAN,
  F. A. WHITELEY.